United States Patent [19]

Davis et al.

[11] Patent Number: 5,027,111
[45] Date of Patent: Jun. 25, 1991

[54] LIQUID-CRYSTAL DISPLAY UNIT FOR ELECTRONIC DIRECTORY

[75] Inventors: William R. Davis, Pasadena; Dennis W. Mowers, Woodland Hills; Richard P. Greenthal, Los Angeles; Paul Szymanski, Simi Valley; Ronald A. Wray, North Hollywood; Richard A. Davidson, Chatsworth, all of Calif.

[73] Assignee: Sentex Systems, Incorporated, Chatsworth, Calif.

[21] Appl. No.: 215,992

[22] Filed: Jul. 7, 1988

[51] Int. Cl.⁵ .............................................. G09G 3/36
[52] U.S. Cl. .................................................... 340/784
[58] Field of Search .......... 340/784, 713, 714, 815.32, 340/815.2, 700; 361/383, 384, 381; 165/104.33; 350/331 T; 362/294; 364/900 MS; 40/448, 585; 312/102

[56] References Cited

U.S. PATENT DOCUMENTS

| | | | |
|---|---|---|---|
| 4,045,791 | 8/1977 | Fukai et al. | 340/784 |
| 4,117,542 | 9/1978 | Klausner et al. | 364/900 |
| 4,268,126 | 5/1981 | Mumford | 350/331 |
| 4,352,274 | 10/1982 | Anderson et al. | 361/384 |
| 4,435,732 | 3/1984 | Hyatt | 362/294 |
| 4,521,079 | 6/1985 | Leenhouts et al. | 350/339 R |
| 4,727,934 | 3/1988 | Eckel et al. | 361/384 |
| 4,763,993 | 8/1988 | Vogeley et al. | 350/331 T |
| 4,847,602 | 7/1989 | Altland et al. | 340/700 |

FOREIGN PATENT DOCUMENTS

0250424 10/1987 Japan ................................ 350/331 T

Primary Examiner—Jeffery A. Brier
Attorney, Agent, or Firm—Ashen Martin Seldon Lippman & Scillieri

[57] ABSTRACT

A liquid-crystal display, preferably twenty-five lines of eighty characters each, is mounted in a case. The temperature of the display medium is maintained within operating limits for the display—notwithstanding ambient temperature and humidity variations over generally normal ranges for at least the temperate zones, and even if the display unit is placed to receive direct sunlight. The unit works outdoors as well as in buildings that lack temperature control. This is accomplished preferably by circulating air from outside the case through a space between the display face and an unperforated protective polycarbonate window. Intake and exhaust plena are long and narrow enough to deter access to the display and thus vandalism; however, the plena are straight and sufficiently free of obstructions that the fan can be a very small, low-power, quiet unit. A temperature sensor controls the fan, and also the contrast-adjusting voltage of the display—based on data in a digital-memory "look up" table. A heater is preferably provided, also temperature-controlled. The plena face downward so that the unit is not sensitive to rain, and the entire unit can be flush-mounted in a wall without disrupting system cooling. Visible glare arising in reflection at the window is reduced by an antireflection coating on the window.

25 Claims, 4 Drawing Sheets

LIQUID-CRYSTAL DISPLAY UNIT FOR ELECTRONIC DIRECTORY

BACKGROUND

1. Field of the Invention

This invention relates generally to practical display units for electronic directories and like electronic tabulations for public viewing; and more particularly to a display unit for an electronically controlled directory that employs a liquid-crystal display.

2. Prior Art

Directories are commonly posted in the public lobbies of business buildings, apartment houses, multiple-building condominiums complexes, and other multiple-occupant facilities. In secured facilities, the entries in such directories often include room or suite numbers, or other numbers for use with an adjacent telephone or intercom in contacting individual occupants to gain admission.

In a few large facilities, recently, hand-lettered or movable-letter directories have given way to electronic systems that are much easier to revise. Such systems eliminate tedious manual reshuffling of placards or letters to keep entries in alphabetical order and to accommodate subdivision or consolidation of occupant suites.

Although they are an enormous improvement over manual directories, the electronic systems have suffered from a major limitation in their use of cathode-ray-tube (CRT) display units. Such video display units, in the forms currently encountered in commercial practice, have several well-known drawbacks.

The drawbacks of CRT displays include image instability, poor resolution and (particularly in bright light) poor contrast. Instability of the image, ranging from minor flicker to vertical roll, can make reading the information on the screen difficult.

Poor resolution severely limits the number of entries that can be displayed simultaneously on a screen of moderate size. This strategy sometimes leads to very large screens that visually dominate a lobby.

Some system designers attempt to avoid this drawback by programming the units in operating modes that call upon a visitor to "page through" different screens to find a particular occupant. The "page through" mode itself is in principle entirely acceptable, but when the number of entries on a screen is unduly small—so that a typical visitor must search through several screens even for a relatively small directory—the typical visitor justifiably becomes annoyed. That is what happens with a CRT display, because of its limitations.

Alternative methods for locating an occupant without paging are either more complicated or more expensive, or both. For example, some systems provide a large alphanumeric keypad and require the user to spell the first few letters of the occupant's name. This increases the system cost and also reduces convenience, particularly for a user who is unsure how to spell the name.

In general all these drawbacks also detract from efforts by facility management to establish an elegant or prestigious style in a lobby or outdoor entry area. Poor contrast is considered among the worst offenders in this regard.

Sometimes, in the interest of offsetting poor contrast, directory system designers introduce the use of colors in the video display. Often, however, this strategy is counterproductive, because the CRT or video colors inject an incongruously gaudy element into a fine decor.

CRT displays are particularly troublesome in brightly lit environments such as outdoors and in lobbies surrounded by large windows that admit brilliant sunlight. In these circumstances, contrast can be so inadequate that the displays are almost completely unreadable.

Moreover, CRT displays are relatively expensive. In large formats they are too deep (front to back) for straightforward mounting in a wall—and so require provision of a free-standing or recessed support structure enclosure two or three feet deep. Because of their evacuated-chamber construction, they are also relatively fragile and inordinately subject to vandalism.

Other types of display are known for use with electronic information processors, but heretofore not with electronic directories or other large electronic tabulations for public viewing. Such other types include the light-emitting diode (LED) and the liquid-crystal display (LCD).

Most LEDs require relatively bulky apparatus for each character to be displayed. Furthermore LEDs are quite dim, and in the few very-small-screen outdoor applications where they have been used (such as some automatic-teller machines) they are extremely hard to read—even when elaborately shaded. A larger LED array such as required for a directory would be prohibitively difficult to shade effectively and would be inordinately expensive.

Under ideal conditions, liquid-crystal displays are capable of excellent contrast and resolution, are plainly readable even in the brightest light, and are readily backlighted for nighttime use. Their use would also result in a far less expensive and much more compact product package. LCDs would accordingly be excellent candidates for directories and the like, but we are not aware of any prior suggestion for such use; and they do have important limitations.

An LCD has a display medium—the liquid-crystal fluid itself—and a structure which contains the fluid. In at least some commercial LCDs this structure typically includes two planar pieces of material with the medium sandwiched between them. At least the piece on the viewing side of the sandwich, which in this document we will call the LCD "face," ordinarily is transparent glass or plastic.

Electrodes are formed on the opposed interior surfaces of this sandwich. These electrodes too are ordinarily transparent on at least the face side. One electrode material is intrinsic tin oxide.

Both the fluid and the glass are very sensitive to temperature. (It may be recalled that the early applications of liquid-crystal displays were as novelty items, particularly including thermometers.)

If the temperature of the glass rises beyond certain relatively narrow limits, the display develops dark spots, or the entire display may actually turn dark. As we understand it, this darkening is due to an expansion of the cell gap within the glass. The black characters or other symbols then fail to stand out well against the darkening background.

On the other hand, if the temperature falls too much, the changing of characters begins to be very slow, an effect which is said to be related to increasing viscosity of the medium. As temperature decreases further the display blushes a different color (e.g., pink)—this time because of the cell gap's contraction—and again becomes unreadable.

Directory applications would call for use of the larger graphic LCDs, and also for a type of medium known as "supertwist" fluid. This kind of fluid provides far superior contrast and hence significantly better readability. The large LCDs, however, and especially those using supertwist fluid, are particularly sensitive to temperature.

Presumably for these reasons LCDs heretofore have been used primarily in applications involving small formats or intrinsic temperature control, or both. Thus LCDs are employed extensively for wristwatches—since they can make good use of LCDs that are smaller and nonsupertwist, and therefore less temperature-sensitive. LCD wristwatches also take advantage of the wearer's limited temperature tolerance, and heat conduction to and from the wearer's body, to limit the severity of temperatures to which the display is exposed.

Even under such relatively protected conditions, fading and blushing or wristwatch displays is well known to athletes and workers whose activities reach the anticipated design limits of the watches.

LCDs are also used for many usually indoor applications such as calculators and laptop computers. Here too they are typically used in temperature-controlled environments, or if they are found to malfunction can generally be moved into such environments.

Operation of large LCDs would be subject to temperature problems in lobbies and other indoor entryways, as well as outdoors, if the locations receive intense sunlight. Temperature rise in such areas sometimes outstrips the capabilities of a building air-conditioning system, and can be severe enough to degrade the performance of an LCD.

If the LCD were inside a case, and were protected from vandals by an unbreakable window, as is desirable in our application, the temperature problem would be aggravated much further. This would be due to a "greenhouse" effect, in which stagnant air between the window and the LCD becomes extremely hot, much like the interior of a car left shut on a hot day.

A related problem of LCD temperature sensitivity involves a voltage that is applied to the display medium to control the contrast of the characters relative to the background screen. The necessary voltage for proper contrast varies very strongly and nonlinearly with temperature.

Thus, as the temperature to which the LCD is exposed changes (e.g., between day and night), the LCD contrast would have to be constantly adjusted to prevent its characters from disappearing or becoming illegible. A very nonlinear relationship between the voltage and the temperature renders the problem of automatic contrast-control technique far from straightforward.

For whatever reason, LCDs have not been used in sizable directory-type displays. We will return to more general discussion of electronic directories and the like.

Another problem arises in configuration of such directories and the like, when outdoor or bright-lobby applications are involved. That is the problem of controlling reflections at glass or plastic surfaces of the display unit.

Such reflections of the viewing person—and of objects around and behind that person, become confused with the displayed characters, making them very hard to read. When sufficiently bright, these reflections actually obscure the displayed characters.

As a verbal shorthand we shall refer to these confusing and obscuring reflections collectively as "glare." Such glare can be controlled to a certain extent by providing a matte finish on the screen itself, provided that the electronic display screen (such as a CRT screen) is directly exposed to the viewing person. Direct exposure of the display screen is accordingly a conventional teaching of the prior art.

This conventional teaching, however, severely limits the use of electronic directories since it makes them susceptible to vandalism. Direct exposure of the display screen makes it easy for a vandal to break the screen or damage the display unit.

Hence there is a conflict between the direct exposure desired to control glare, and the interposition of an intermediate protective window desired to control vandals. This conflict is present with CRTs and LEDs—but particularly acute with LCDs because of the very way they work.

CRTs and LEDs inherently generate their own illumination, but LCDs usually depend upon incident light for their characters to be seen. Different portions of the fluid will either absorb or reflect incident light, and thus form visible characters, depending on whether or not the fluid is electrically excited.

This mechanism explains why LCD characters do not seem to fade in direct sunlight as do CRT and LED characters. Light that is reflected at a glass or plastic surface, however, is light not used to develop visible LCD characters—and, in fact, is light that creates reflections which compete with the already diminished LCD characters.

Thus, again, even if there had been a suggestion of LCD use in electronic directories, such a suggestion would have been particularly likely to meet with immediate rejection in view of the relatively adverse glare-related properties of LCDs.

Finally, even though the electronic directory systems currently available are far more convenient in terms of entering and deleting names than the movable-letter or placard directories, they still require local procedures for entries or revisions—either at the system itself or through a computer close by. This arrangement is very inconvenient for buildings that have off-site property management, especially when tenant turnover is high and frequent directory changes required.

All of the above limitations have resulted in the relatively limited use of currently available electronic directories. As can now be seen, the prior art has failed to provide an adequate display system for directories and the like, particularly for use out of doors and in lobbies or other entryways subject to intense sunlight.

SUMMARY OF THE DISCLOSURE

Our invention is a display unit for an electronic directory. It includes a case, and it also includes a liquid-crystal display (LCD) that is mounted within the case.

Like all liquid-crystal displays, the LCD that is part of our display unit has a display fluid, liquid or the like which we will call the "display medium"; and a structure (described in an earlier section of this document) that contains the fluid. As is well known, the operating temperature of the display medium and structure—and therefore of the display in general—has a distinctly limited range. Even within this limited range, performance varies strongly with temperature.

Our display unit also includes some means for maintaining the temperature of the liquid-crystal display medium and structure between practical operating limits for the display. For generality of expression in describing our invention, we shall refer to these means as the "temperature- maintaining means."

These temperature-maintaining means are at least partially mounted within the case. They maintain the display-medium and display-structure temperature within its operating range notwithstanding ambient temperature and humidity variations over generally normal ranges for at least the temperate zones.

Furthermore the temperature-maintaining means maintain the temperature within practical limits even if the display unit is placed to receive direct sunlight when the sun is out.

The foregoing may be a definition of our invention in its broadest or most general terms. For maximum enjoyment of the benefits of our invention, however, we prefer to incorporate certain additional features or characteristics into devices made in accordance with the invention.

For example, we prefer that the temperature-maintaining means hold the temperature of the medium and structure at least between positive 160 degrees and negative 35 degrees Fahrenheit. We consider these limits adequate to provide reasonably good, reliable performance.

To provide even better and more reliable performance, however, we prefer that the temperature-maintaining means hold the temperature of the medium and structure between even tighter limits. It will be understood that there is a continuum of improving performance and reliability with progressively narrower operating limits, so that no absolute values can be stated; but through much careful trial and error it is possible to select temperature limits that are cost effective.

Accordingly we prefer that the temperature-maintaining means hold the temperature of the medium at least between positive 120 degrees and negative 15 degrees Fahrenheit. We prefer that the temperature-maintaining means do so in direct sunlight with ambient temperature between 115 and −40 degrees Fahrenheit.

In a preferred form of our invention, the temperature-maintaining means include an external viewing window mounted to the case and generally spaced away from the LCD face, along the viewing direction. The viewing window thus defines an air-circulation region immediately adjacent to the face. This window is preferably breakage resistant and so provides an additional important function: resistance to vandalism.

This preferred embodiment also has some means for defining intake and exhaust plena. Again for purposes of generality in expression, we will call these means the "plenum-defining means."

The plenum-defining means define an intake plenum leading from the outside of the case to the air-circulation region, and a separate exhaust plenum leading from the air-circulation region to the outside of the case. Each plenum is long and narrow enough to substantially deter manual access to the liquid-crystal display through the plena.

The preferred embodiment under discussion also has at least one fan disposed to circulate air from the intake plenum through the air-circulation region to the exhaust plenum. The intake and exhaust plenum terminations at the outside of the case face downward, and preferably are in the bottom of the case itself.

In principle the viewing port can simply be left open —that is, with no viewing window at all—to optimize the air circulation for temperature control. Alternatively the viewing window can be perforated, to provide some air circulation through the window port as well as behind it. Omitting the viewing window also has the advantage that there is no glare-producing reflective surface spaced forward from the LCD.

Such systems are in fact within the scope of our invention as most broadly defined above. They may be preferable in some types of installations, particularly where the risk of vandalism is minimal. That is so, for example, where the display unit is only exposed to employees of the facility or to other prequalified personnel.

For more general applications, however, even at the cost of some benefit in temperature and glare control, we prefer to enhance security by including a viewing window that is free of perforations. We have found that even with such a window it is possible to achieve completely adequate temperature control with very low cost, low power consumption and low fan noise.

In particular we achieve these advantages by using a fan that is free of air-flow obstructions such as guard meshes or louvres, and by making each plenum at least very generally straight and substantially free of air-flow resistance elements such as guard meshes, louvres, or abrupt surface discontinuities of the plenum itself.

This geometry makes it possible to achieve the needed air circulation using only a very quiet, low-power fan. For best temperature control, we prefer to provide two such fans, one associated respectively with each plenum.

We dispose each fan substantially adjacent to the LCD face, substantially out of sight of viewers examining the LCD medium through the viewing window along typical viewing directions. It will be understood that the fan or fans need not be operated at all times, but only when ambient temperature and incident sunlight cause the temperature to drift outside acceptable operating limits.

We prefer to include a temperature sensor for monitoring the temperature of the LCD medium. We also prefer to include some means for controlling the fan in response to the sensor. Again for generality, we shall call these the "fan-controlling means."

We prefer to use the same sensor to adjust the LCD contrast-control voltage too. The sensor controls that voltage through a voltage-adjusting circuit that includes an analog-to-digital ("A/D") temperature-conversion stage and a digital electronic memory. This memory holds a lookup table for establishing desirable contrast-control voltage values for various temperatures.

After some experimentation we have come to prefer this system because the voltage requirement varies strongly with temperature, particularly toward the extremes of the temperature operating range, and is difficult to represent in closed form as by a formula. We prefer to include A/D conversion of temperature because representing the voltage-temperature relationship with an analog circuit is relatively difficult and expensive.

Because that relationship is difficult to represent in closed form as by a formula, we prefer to use a look-up table. This approach has the added benefit of allowing us to easily change the relationship to account for differences in display lots or even different displays we might subsequently use.

We also prefer to provide a heater for raising the LCD temperature, and to provide "heater-controlling means" for operating the heater only when needed. The heater-controlling means are also responsive to temperature.

As previously mentioned, visible glare can arise in reflection at the solid viewing window. Nonreflecting glass such as is used with picture frames fails to cure such glare, as the nonreflecting characteristic is attained by using a matte finish; and only images immediately behind the glass are clearly visible through such a finish.

It may be emphasized that the LCD face itself typically carries such a matte finish, which does in fact minimize glare arising at the LCD face. The glare now under discussion, however, arises not at the LCD face but at the forward viewing window.

We have found that such glare can be effectively controlled by vacuum-depositing an antireflection coating of the type used for eyeglasses. Resort to this solution is far from obvious, since the equipment used for coating eyewear is particularly configured for that purpose—particularly for simultaneous coating of a large number of small lenses, not our much larger viewing windows.

Once it is called for, however, the modification of such equipment for coating viewing windows of the type under discussion here is straightforward, for a person skilled in the art of mechanical devices.

the viewing window is preferably of unbreakable plastic such as polycarbonate. The best materials for use in forming a graded-index antifreflection coating for the window accordingly may differ from those used for eyeglasses.

In particular, we prefer to make the viewing window of the plastic available commercially under the trade name "Lexan." After some experimentation it has been found that the antireflection coating may include three layers of material on both sides of the Lexan window, each layer being a different material. In the alternative, with better performance, five layers may be used on both sides of the window.

The formulation for the three-layer and five-layer alternatives can be those commercially available from Pacific Universal Corporation in Pasadena, California, under the names "AR-narrow band" and "AR-broad band" formulations, respectively, for polycarbonate. These names would also identify similar composite coatings of other suppliers.

As mentioned earlier, prior to our invention, all electronic directories required local programming, either at the unit or through a computer close by, via a hardware connection. Our electronic directory system can instead be programmed remotely from any location via telephone line, using either a modem sand terminal or a tone-transmitting telephone by itself. In the later case, our electronic directory system provides synthesized voice responses to supply status and progress information to the programmer over the telephone.

Our system can also be programmed locally, using a very inexpensive hand held membrane-type alphanumeric keypad that plugs into the system electronics directly. Alternatively, the system can also be programmed using a twelve-button keypad on the front panel of the system.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

Figures 1, 3:
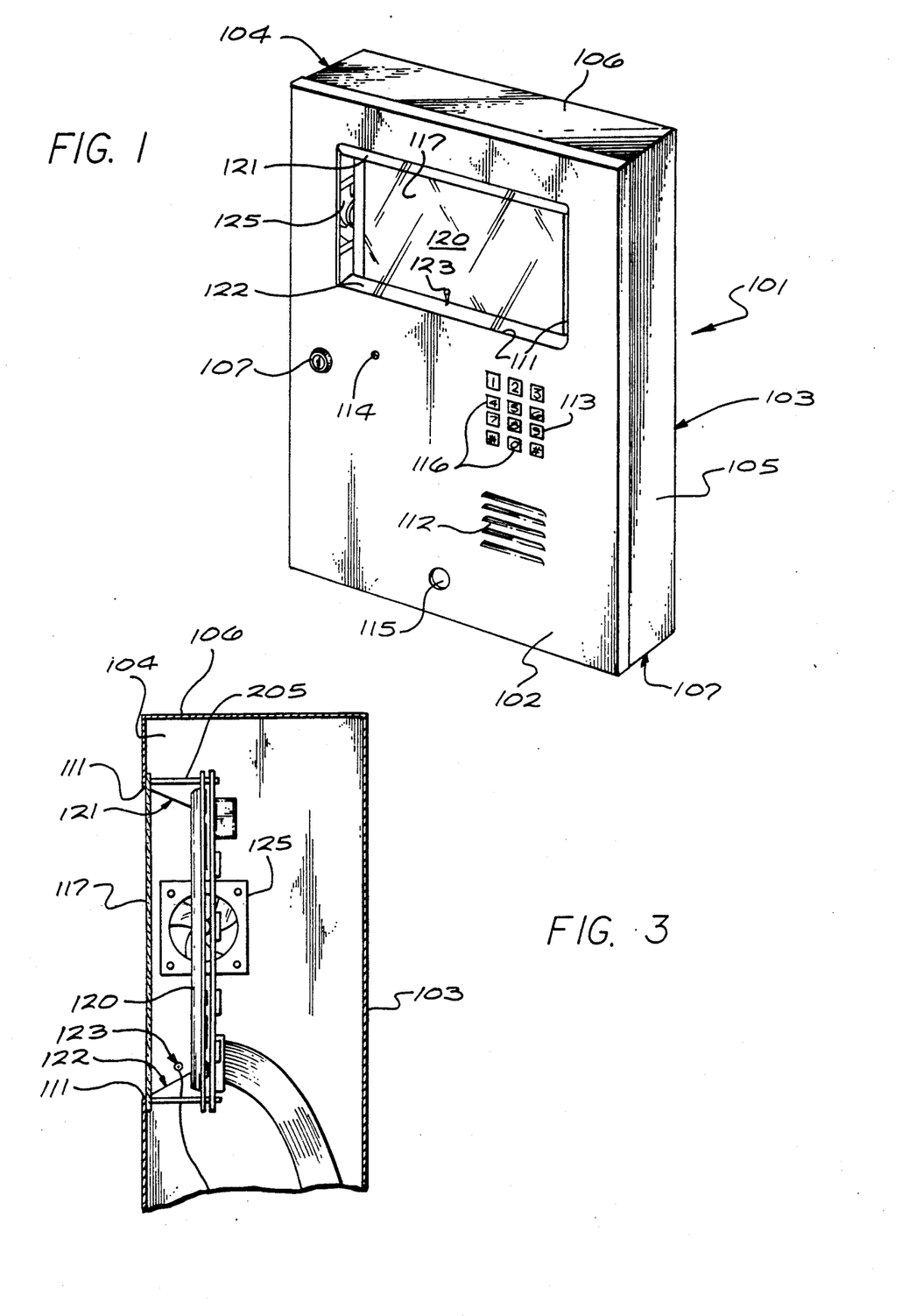
FIG. 1 is an exterior perspective drawing, taken from slightly above and to one side, of a display unit that is a preferred embodiment of our invention.
FIG. 3 is a side elevation, partly in cross-section and enlarged, showing the relationships of the viewing window, the LCD face, and the temperature sensor.
Figure 2:
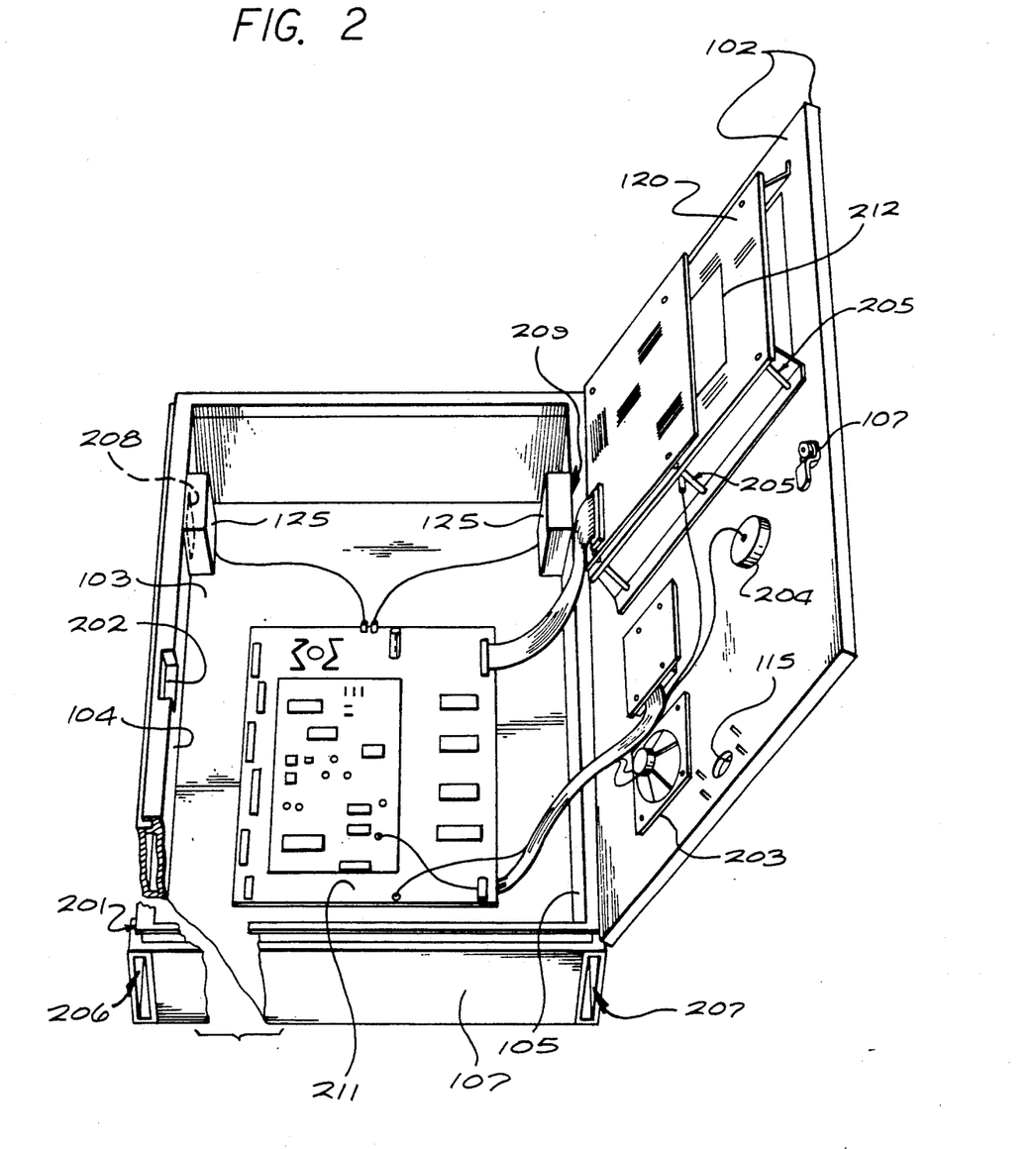
FIG. 2 is an interior perspective view, taken from below and drawn partially broken away, of the FIG. 1 embodiment with its front panel opened to show the interior construction and arrangement.

As seen in FIGS. 1 and 2, the preferred embodiment of our display unit has a case 101 that includes a front panel 107. The case 101 also includes a rear wall 103, left and right side pillars 104, 105, a ceiling 106, a floor 107, and a rain gutter 201 (FIG. 2). We prefer to make the front panel stainless steel and the case painted cold-rolled steel.

The front panel 102 is hinged to the right pillar 105, and provided with a keyed lock 107 that engages a strike groove 202 (FIG. 2) formed in the left pillar 104 to secure the front panel firmly against the rear parts 103–106 of the case. Formed in the front panel 102 are a viewing port 111, louvres 112 and an array of twelve small square access holes 113, a small hole 114 and a larger hole 115.

The louvres 112 are provided for transmission of sound from an audio speaker 203 (FIG. 2) that is mounted behind the front panel 102. The square access holes 113 accommodate twelve pushbuttons of a standard telephone-type pushbutton array 116. The small hole 114 allows for transmission of sound to a microphone 204 (FIG. 2) that is mounted directly behind the hole. The larger hole 115 is for installation of a post-office key lock. If this lock is not used, a plug fills the hole.

Securely mounted to the rear surface of the front panel 102, behind the viewing port 111, is a polycarbonate viewing window 117, which carries an antireflection coating. Behind the window is an LCD 120, preferably eight to twenty-five rows of twenty to eighty characters each.

As previously explained, the antireflection coating on the window 117 reduces "glare" (as defined above) sufficiently that the LCD 120 can be read. This function is particularly important when the LCD is facing away from the incident sunlight.

When that is so, the person attempting to read the LCD is facing into the sun, and is brightly illuminated. Under these circumstances the reflected image of the person's own face and surroundings, as seen in the window 117, can be extremely bright and can almost totally obscure the LCD.

It is believed that the provision of an antireflection coating in our invention is particularly unobvious, for at least three reasons. First, the very existence of the glare problem is much less evident than the problem of temperature control.

In our own development of the present invention, all our concern and early tests were directed to verifying that our apparatus would work even with direct sunlight impinging upon and heating the LCD. Therefore prototypes were always tested with the LCD facing toward the sun. We did not realize that we had inadvertently selected a mode of test in which the problem of glare was minimal.

On one occasion, when we had not yet perfected the temperature control aspects of our invention, we were asked about the possibility of installing an electronic directory in a north-facing wall. We supposed that such an installation would be uneventful, since direct heat loading in the particular facility could be very low.

After positioning a prototype in the subject facility, however, we were quite amazed to discover that the LCD in the prototype was virtually invisible because of glare. Only then did we become aware of this glare problem.

There is a second reason that use of antireflection coating is particularly unobvious. The LCD industry has settled upon the use of antireflecting surfaces—i.e., a matte finish—on the LCD face.

This is the industry's solution to reduction of what little glare is present in use of a laptop computer and the like. Such a finish cannot be used on windows that are spaced forward from the LCD, as we found by actual attempts —but the common wisdom of the industry in this regard tends to distract attention from alternatives.

Another seemingly fruitful avenue was use of a tinted window. Only after a significant effort could we conclude that such a technique was not effective. The tinted window reduced light transmission to and from the LCD, making it too dim to read. What we needed was an antiglare coating that was substantially invisible.

It was not through the teaching of the LCD or directory industry, but only by happening to think of a recent personal incident involving a different field, that we came upon the idea of antireflection coatings. More specifically, one of the present inventors had only recently ordered a pair of eyeglasses, and recalled having been offered an antireflection coating at a small added price. He also recalled that this coating was described as untinted and invisible, and he accordingly thought that it might not suffer from the problems of other coatings.

There is yet a third reason for characterizing eyeglass-type antireflection coatings as unobvious in connection with the present invention. In our preliminary inquiries regarding the possibility applying such coatings to our windows, we were consistently informed that such application would be prohibitively expensive.

The basis for this information was that standard equipment had developed for coating large numbers of eyeglass lenses at once. Further, use for eyeglasses appeared to be the primary segment of the antireflection-coating industry. Without extensive modification, such equipment was (and it is) inappropriate for coating viewing windows large enough for an LCD screen.

Business people who have such equipment were understandably reluctant to invest in such modification on behalf of a new product with unproven market performance. Accordingly we were led to believe that antireflection coating of our windows would be uneconomic.

That belief persisted until, after considerable effort, we found a relatively small operator for whom our project represented a significant amount of business. That firm was accordingly willing to undertake the needed modifications.

It is possible that with future refinements of fluorescent backlighting in LCDs it may become possible to make the LCD itself so bright as to be clearly visible even in the presence of glare at the viewing window. For the present, however, the provision of substantially invisible antireflection coatings is an important advance.

Six metal extenders 205, spaced along the top and bottom edges of the viewing port 111, stand the LCD 120 off from the rear surface of the front panel 102, defining an air space between the viewing window 117 and the LCD 120. These six extenders are fixed behind the panel 102 by six mounting studs.

The extenders 205 pass through holes in the top and bottom brackets 121, 122 and in the viewing window 117; and secure the brackets and viewing window in place. From the perspective of a user of the apparatus, the brackets 121, 122 hide the extenders from view, providing a finished look to the assembly.

The brackets also contour the air-circulation region, to provide for more-nearly laminar air flow. The brackets do not extend along the side edges of this air space, which is accordingly unobstructed at both sides.

A circulating fan 125 is mounted to each side pillar 104, 105, along the inward-facing surface of the pillar and near the ceiling 106. These fans 125 are vertically aligned with the LCD 120, roughly, and are aligned in the front-to-back direction so that the front half of each fan 125 is roughly adjacent to the air space formed between the window 117 and LCD 120.

Strictly speaking the fans 125 are visible from outside the case 101 by a viewer looking through the window 117 at an acute angle to the front panel 102 and window 117. Ordinarily, however, the fans 125 are outside the lines of view of a person standing in front of the device and reading the LCD 120. Moreover, advantageously the fans are of dark-colored material while the screen and the front panel 102 are of light-colored material, so that the fans are quite inconspicuous—particularly when operating.

Each side pillar 104, 105 is a rectangular vertical tube open at the bottom 206, 207, as shown (FIG. 2), apertured at 208, 209 near the top along the inward-facing surface for passage of air through the corresponding fan 125, and unobstructed between the bottom opening 206, 207 and the fan aperture 208, 209. Each pillar thus serves double duty as a very sturdy structural member of the case 101 and as an air-passage duct or plenum.

Depending upon the direction of fan operation, air enters either opening 206 or 207, and is exhausted through the other. For installations where temperature or sun loading is never very high, one or the other fan 125 can be omitted.

From the scale established by the standard telephone pushbutton array 116 it can be readily seen that each plenum is too narrow for passage of a person's arm, and contains no apparatus that could be readily damaged by insertion of a bar or other tool from the bottom. Hence the plena are reasonably vandal resistant.

Yet they are also straight and unobstructed, and therefore offer a very minimum of resistance to air circulation by the fans 125. Consequently, as mentioned earlier, the fans can be of a particularly low-power, quiet type such as the 1.8-watt, 18-cubic-foot-per-minute model TFDD6012 RXA commercially available from the Toyo Corporation of Japan.

Because the openings 206, 207 located at the base of the pillars 104, 105 face downward, rain cannot enter the case through them. Moreover, this arrangement allows the case to be flush-mounted in a wall without disrupting air intake and exhaust.

The LCD itself is preferably a Model EG 2402-AR supertwist type made by Seiko Epson Corporation, or a Model LM 674 XGNR supertwist type, made by Hitachi Corporation. The choice of models depends on whether the number of occupants to be listed on the screen at once can be adequately presented on an eight-line, forty-character screen or justifies use of a twenty-five, eighty-character screen, respectively.

The display can be operated from a microprocessor or even a personal computer or other microcomputer, in very generally conventional fashion. We prefer, however, to use novel electronics and software which we have developed. These additional subsystems optimize the performance of the display as part of a novel programmable electronic directory system, as will be described shortly.

Immediately behind the window 117, in the space between the window and the LCD 120, is a thermistor element 123, disposed to receive substantially the same radiant-heat loading from incident sunlight as does the LCD 120. This thermistor, perhaps best seen in FIG. 3, is excited and monitored by portions of the electronic circuitry 211 within the case 101, and the resulting temperature information is used to control both the fans and the LCD contrast voltage.

As also shown in FIG. 2, a small strip heater 212 is advantageously mounted behind the LCD 120. This heater too is temperature-controlled; however, it need not be made responsive to the thermistor 123. The heater element itself is self-regulating: its resistance increases with temperature, tending to reduce heat output. The heater can be a twelve-volt d. c. model CDH 00310 commercially available from Midwest Components, Inc. of Muskegon, Michigan.

Approximate dimensions (in inches) of the apparatus are collected here:

| case 101 | height | 19 |
|---|---|---|
| | width | 15.3 |
| | depth | 3.8 |
| port 111 | height | 5.3 |
| | width | 10.3 |
| window 117 | height | 6.5 |
| | width | 11 |
| | thickness | 0.1 |
| plena 104, 105 | width | 0.9 |
| (pillars) | depth | 2.9 |

Thus our invention encompasses several important innovations relating to provision of a high-resolution, high-contrast, essentially glare-free display for electronic directories and the like. It is particularly advantageous in outdoor installations, and in building entries or lobbies where temperature and brightness of illumination are not well controlled.

Our invention further encompasses important innovations in a programmable electronic directory system. These innovations will be described herebelow.

As mentioned earlier, prior to this invention, electronic directory systems had to be programmed at the directory unit itself or by a computer close by. Our invention allows for programming of the directory from a remote location over the telephone lines using a modem and terminal or by using a standard tone-transmitting telephone by itself. The system can also be programmed locally using a handheld programmer, the system's keypad, or via the system's RS-232 communications port. Thus, in addition to providing both remote and local programming capabilities in the same machine, the system is capable of managing a multiplicity of programming input devices. Moreover, the system can be programmed while it is being used without the programmer or the user realizing the other party is using the machine. However the system is programmed, names are automatically alphabetized and put in their proper location on the directory.

Figure 4:
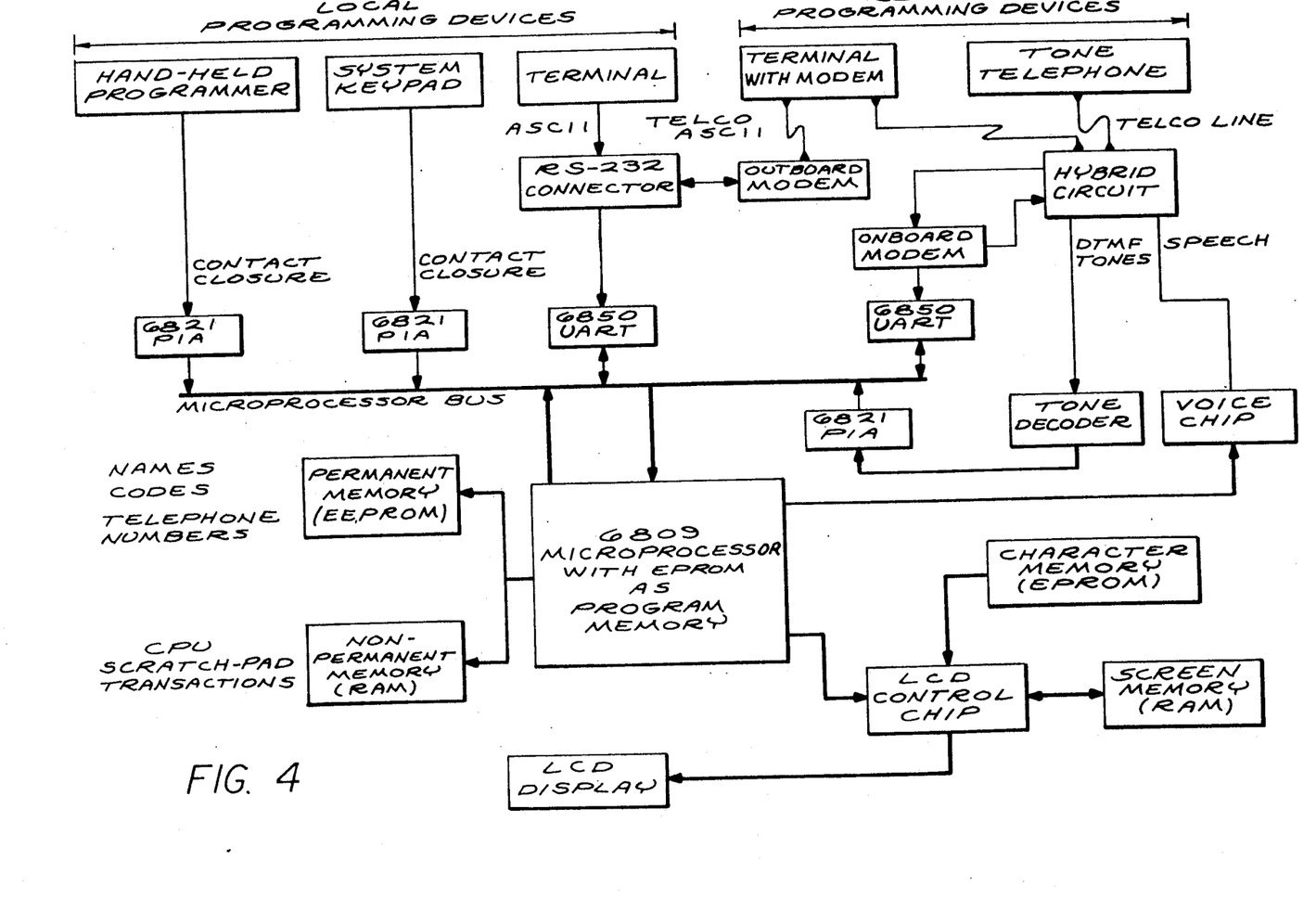
FIG. 4 is a block diagram of the programming processing flow for the system and shows the different programming devices that can be used along with the major electronic components used to process their input.
Figure 5:
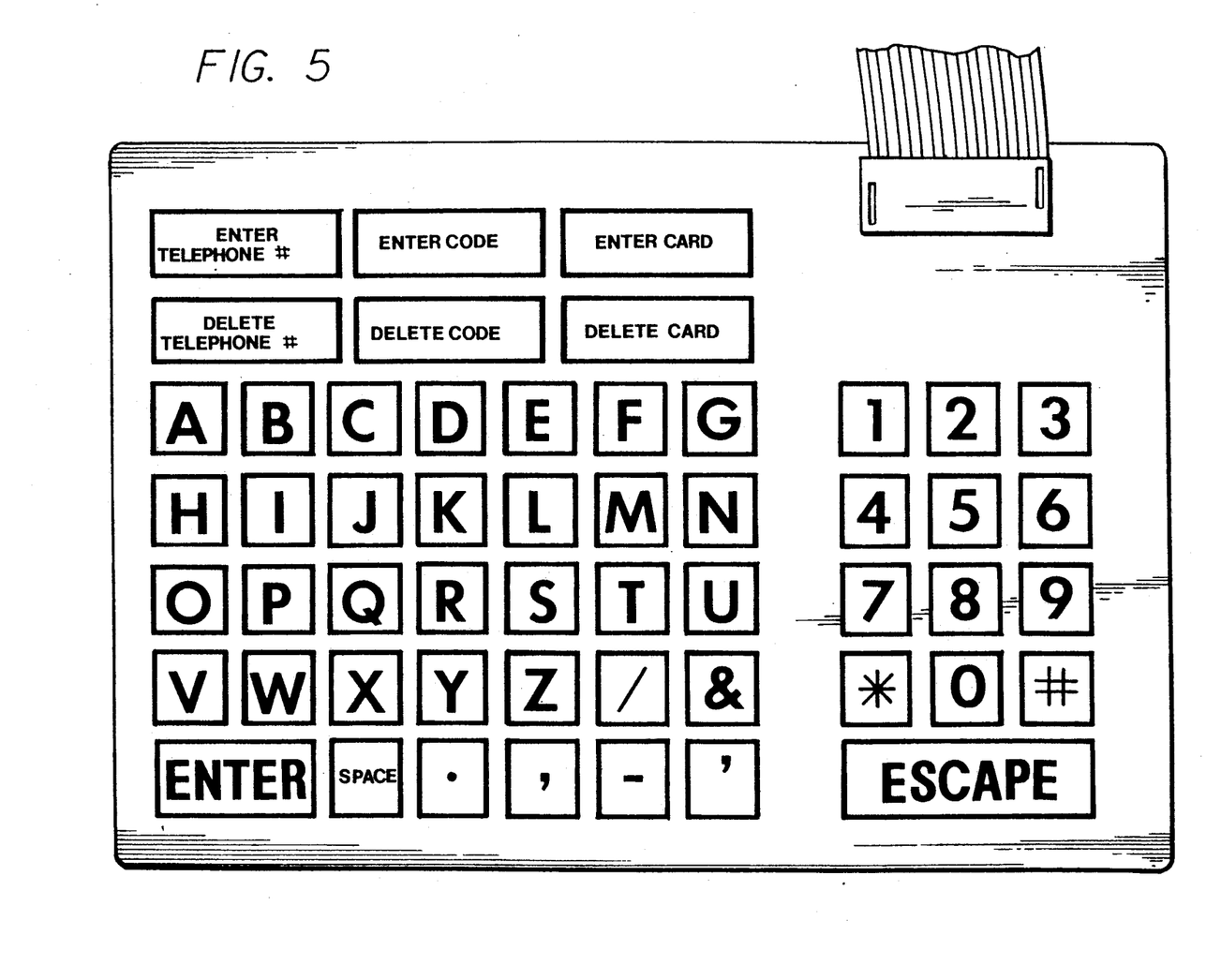
FIG. 5 is a picture of our handheld programmer—one of the devices used to program the system at the system.

FIG. 4 gives an overview of the programming processing flow and shows the different programming devices that can be used along with the major electronic components used to process their input. Local programming is generally done using a handheld programmer of our own design (pictured in FIG. 5) which plugs directly into the system's electronics 211 (FIG. 2) via ribbon cable. The programmer is an alphanumeric membrane keypad that simply provides contact closure output. As a result, it is extremely rugged, very thin, small sized, and very inexpensive.

As can be seen from the graphics on the keypad, it as well as our system can do substantially more than provide for an electronic directory. In one of its forms, the system can be a complete access control system providing for both occupant and visitor access control, using card or code entry for occupants and telephone entry for visitors. In this system configuration, the electronic directory would normally be part of the telephone entry function for visitor access control. The microphone 204 (FIG. 2) and the speaker 203 (FIG. 2) are for communications between the visitor and the person being contacted in the building whose name is listed on the electronic directory. This system configuration is, however, only one form in which the electronic directory could be used and in no way is intended to limit the scope of our claims.

The system's 12-button keypad, which also provides simple contact closure output, can also be used to program the system locally. In this instance, 2-digit numbers are used to encode letters. While the keypad is more cumbersome for alphanumeric programming, it is a useful back-up in case the user has misplaced the handheld programmer.

The contact closure outputs of the handheld programmer and system keypad go to separate PIAs (Parallel Interface Adapters) and then to the system's microprocessor. We use a Motorola 6809 microprocessor and Motorola 6821 PIAs. The PIAs serve to expand the available ports on the microprocessor and have hardware "interrupts" (a pin on the chip that is in a high or low state) that alert the microprocessor that data is on the PIA and ready to be retrieved. Once the microprocessor has retrieved that data from a single keypress it loads it into RAM (random access memory) and displays it on the LCD as it does programming prompts and messages. When the data entry from one or more keypresses has been completed it is then loaded into EEPROM (electrically erasable programmable read only memory) where it will reside until erased. We use EEPROM for permanent memory because of its non-volatility—the ability to keep its memory contents without any external power. The EEPROM we use is a Samsung 2864.

The third method of local programming is via the system's RS-232 port using any RS-232 compatible device (e.g., a terminal). Since the baud rate on the system's RS-232 port is selectable (300, 1200, 2400, and 4800), the port will accommodate a wide range of devices. The serial ASCII data that comes into the RS-232 connection goes to a UART (Universal Asynchronous Receiver Transmitter) which converts the serial data to parallel data and also has a hardware interrupt to alert the microprocessor that it has data. We use Motorola 6850 UART. The microprocessor handles the data the same as it does from the handheld programmer and keypad, except that it displays the data on the device connected to the RS-232 port (e.g., the terminal's video screen).

The RS-232 port also provides a means of remote programming in that a modem can be connected to the RS-232 port and thus allow communications with the system over the telephone lines from a remote location having a modem and terminal. Our system also has an onboard 300-baud modem chip (National 74HC943) which eliminates the need for an outboard modem. An outboard modem would be used only if a faster than 300 baud data transmission rate was desired. A "dumb" terminal as opposed to a personal computer (PC) can be used in either case since all the necessary intelligence resides in our system.

The serial ASCII data from the onboard modem is sent to a UART and then to the microprocessor. Data entries and system prompts are sent back to the modem which then transmits them over the telephone line to the modem and terminal at the remote location where they are displayed on the terminal's video screen.

A standard tone telephone can also be used to program the system from a remote location. The DTMF (Dual Tone Multi Frequency) tones are received by a tone decoder chip (Mitel 8870) in the system's electronics which decodes the frequencies by comparing them to a crystal oscillating at 3.579545 MHZ. The decoder chip then represents the decoded frequency in digital form where it is then sent to a PIA and then to the microprocessor. The decoder chip has a hardware interrupt, as does the PIA, for notification that data is ready for transmission. The microprocessor processes the data as before except that instead of data and prompts being displayed on a screen, a voice chip (SSI-263) generates synthesized voice responses and prompts which are sent back over the telephone line to the programmer at the remote location.

Having the ability in the same electronic directory unit to be programmed via modem and by tone telephone using just one telephone line for the system is not straightforward and is another novel aspect of our invention. As far as we are aware, all other systems with both means of programming (not other electronic directory systems which have neither capability) require two telephone lines, one for modem programming and the other for tone programming (e.g., electronic banking systems). The difficulty is that a means of sorting the incoming signal types from a common input source is needed. The source in this case is the unknown type of telephone call being answered.

We accomplish this by using an active hybrid circuit. The hybrid is an analog three-port circuit design having an input port, an output port, and an input/output port that enables the concurrent testing for either an incoming modem signal or a DTMF signal. The modem transmitter's and voice chip's outputs are fed to the input port and both the modem receiver and the DTMF receiver's inputs are connected to the hybrid's output port. The telephone line interface feeds signals both into and out of the active hybrid's input/output port.

When the system is called, it senses the ring signal on the line and integrates these occurrences over a period of time to avoid falsely answering on noise pulses. The system then answers by seizing the line and, after a 2.2 second delay, answers in English speech by saying "hello." It then presents the modem answertone and "listens" concurrently for either an originate tone from a possible modem originating station or a DTMF tone. If an originate tone from a modem is detected, the unit will ignore subsequent DTMF tones. Conversely, if a DTMF tone is detected, the unit turns off its modem answertone, ignores any subsequent modem frequencies, and obeys only the incoming DTMF commands.

The other feature of the active hybrid is the cancellation of leakage between the input port (transmitter output) and the output port (receiver input). This is accomplished by the mathematics inherent in the design. When the sidetone balance (the relative impedance of the system vs. the phone line) is adjusted properly, a close impedance match to the telephone is achieved and a high degree of output-to-input leakage suppression results. This condition makes it possible for multiplexing both the modem and the DTMF receiver on the same telephone line since the modem's transmitter cannot overpower the sensitive DTMF receiver's input stage.

Finally, as mentioned earlier, one of the forms of our electronic directory system is as part of an access control system. When used in this configuration, the system has a buffer memory capable of automatically storing the last several thousand transactions. Transactions include entries made using cards or codes, entries granted by telephone, as well as alarm conditions and the like. If the buffer is filled, the oldest transaction is deleted when a new transaction is entered. The information recorded for each transaction includes the time, date, type of transaction, entry point, card or code used, attached name, and action taken (e.g., access granted or denied).

Our system allows this data to be retrieved when the system is in the programming mode, either locally or remotely, with the data displayed on the system's LCD, a printer, or a terminal, depending on the programming mode as discussed earlier. The chip we use for the transaction buffer memory is an RCA 6264 eight-thousand byte RAM or a RCA 62256 thirty-two thousand byte RAM. The size depends on the maximum number of transactions wished to be retained.

We have also created a software program on floppy disk that allows the data in the transaction buffer to be sorted after it is retrieved. Sorting can be by date and time source and type of transaction, code used, name, and action taken. Thus, a user can focus in more narrowly on the specific transactions he wishes to review.

The program also allows the programmed information stored in the system's EEPROM memory (e.g., names on the directory, codes, telephone numbers, etc.) to be downloaded to a floppy disk. Thus, a back-up disk file of the system's memory can be maintained. This is a particularly attractive feature with directory units having the capacity for a large number of names, where loss of the system's memory (e.g., due to lightning strike)

would necessitate reprogramming many names. With this floppy disk program, the names on the back-up disk file can simply be uploaded to the affected system once it is back in commission.

This floppy disk program can be used in any IBM-compatible PCs with DOS-2.0 or higher. The PC can be connected directly to the system via RS-232 connection or it can communicate with the system via modem since the floppy disk program includes the terminal emulation and communications software necessary for a PC to be able to communicate via modem.

It will be understood that the foregoing disclosure is intended to be merely exemplary, and not to limit the scope of the invention—which is to be determined by reference to the appended claims.

We claim:

1. A vandalism-resistant and weather-resistant display unit for an outdoor-installed electronic directory, comprising:
 a substantially vandalism-resistant and weather-resistant case for outdoor installation;
 a liquid-crystal display, mounted within the case, and having a display medium and a structure for containing the display medium;
 the liquid-crystal display structure comprising a face disposed in front of the medium, for displaying directory information outdoors in the form of a directory;
 means, at least partially mounted within the case, for protecting the liquid-crystal display against vandalism and rainwater and for maintaining the temperature of the liquid-crystal display medium and structure between practical operating limits for the display, notwithstanding ambient temperature and humidity variations over generally normal ranges for at least the temperate zones, and even if the display unit is placed to receive direct sunlight when the sun is out; the protecting and temperature-maintaining means comprising:
  an external viewing window mounted to the case and generally spaced away from the liquid-crystal display structure face, along a viewing direction, to protect the liquid-crystal display and to define an air-circulation region immediately adjacent to the face;
  means defining an intake plenum leading from the outside of the case to the air-circulation region, and a separate exhaust plenum leading from the air-circulation region to the outside of the case, each plenum being long and narrow enough to substantially deter manual access to the liquid-crystal display through the plena; and
  at least one fan disposed to circulate outdoors ambient air from the intake plenum through the air-circulation region to the exhaust plenum to reduce heating by the sun; and
 solid-state digital electronic circuitry, electrically interconnected with the liquid-crystal display, for electronically storing directory information and for controlling the liquid-crystal display unit to automatically exhibit stored directory information in the form of a directory having multiple listings in an alphabetical or like order or in classified groupings.

2. The display unit of claim 1, wherein:
 the temperature-maintaining means hold the temperature of the medium and structure at least between positive 160 degrees and negative 35 degrees Fahrenheit.

3. The display unit of claim 1, wherein:
 the temperature-maintaining means hold the temperature of the medium and structure at least between positive 120 degrees and negative 15 degrees Fahrenheit, in direct sunlight with ambient temperature between positive 115 and negative 40 degrees Fahrenheit.

4. The display unit of claim 1, wherein:
 the intake and exhaust plenum terminations at the outside of the case face downward.

5. The display unit of claim 1, wherein:
 the intake and exhaust plenum terminations at the outside of the case are in a bottom of the case; and
 the viewing window is of unperforated material.

6. The display unit of claim 1, for use in a facility that has a wall; and wherein:
 the intake and exhaust plenum terminations at the outside of the case are in a bottom of the case; and
 the display unit is mounted with its viewing window generally flush with such facility wall.

7. The display unit of claim 1, wherein:
 the fan is free of air-flow obstructions such as guard meshes or louvres;
 each plenum is at least very generally straight and substantially free of air-flow resistance elements such as guard meshes, louvres, or abrupt plenum-surface discontinuities; and
 the fan is disposed substantially adjacent to the liquid-crystal display face.

8. The display unit of claim 7, wherein:
 the fan is substantially out of sight of viewers examining the liquid-crystal display medium through the viewing window along typical viewing directions.

9. The display unit of claim further comprising:
 a temperature sensor for monitoring the temperature of the liquid-crystal display medium and structure; and
 means, responsive to the sensor, for controlling the fan.

10. The display unit of claim 9, further comprising:
 means for automatically adjusting voltage to control contrast of the liquid-crystal display; and
 wherein the voltage adjusting means are also responsive to the sensor.

11. The display unit of claim 10, wherein:
 the voltage adjusting means comprise analog-to-digital conversion means and digital electronic memory means; and
 the digital electronic memory means define a lookup table for establishing desirable contrast-control voltage values for various temperatures.

12. The display unit of claim further comprising:
 a heater for raising the temperature of the liquid-crystal display; and
 means, also responsive to temperature, for controlling the heater.

13. The display unit of claim 10, further comprising:
 a heater for raising the temperature of the liquid-crystal display; and
 means, also responsive to temperature, for controlling the heater.

14. The display unit of claim 5, wherein:
 the fan is free of air-flow obstructions such as guard meshes or louvres;
 each plenum is at least very generally straight and substantially free of air-flow resistance elements such as guard meshes, louvres, or abrupt plenum-surface discontinuities; and the fan is disposed substantially adjacent to the liquid-crystal display structure face.

15. The display unit of claim wherein:

the fan is substantially out of sight of viewers examining the liquid-crystal display medium through the viewing window along typical viewing directions.

16. The display unit of claim 1, further comprising:

substantially nonattenuating mounted to the case, for reducing visible glare arising in reflection at the window.

17. The display unit of claim 5, further comprising:

substantially nonattenuating means, mounted to the case, for reducing visible glare arising in reflection at the window.

18. The display unit of claim 13, further comprising:

substantially nonattenuating means mounted to the case, for reducing visible glare arising in reflection at the window.

19. The display unit of claim 14, further comprising:

substantially nonattenuating means, mounted to the case, for reducing visible glare arising in reflection at the window.

20. The display unit of cliam 15, further comprising:

substantially nonattenuating means, mounted to the case, for reducing visible glare arising in reflection at the window.

21. The display unit of claim 16, wherein:

the glare-reducing means comprise an antireflection coating on the viewing window.

22. The display unit of claim 20, wherein:

the glare-reducing means comprise an antireflection coating on the viewing window.

23. The display unit of claim 20, for use in a facility having a multiplicity of occupants; and wherein:

the liquid-crystal display has at least eight lines of at least twenty characters each, and serves as a directory to display a multiplicity of occupant names and respectively related alphanumeric information;

the viewing window is substantially taller than the liquid-crystal display structure face, and is disposed so that information displayed near top and bottom edges of the liquid-crystal display structure face is visible to viewers of greatly differing heights and at varying distances from the viewing window; and the display unit further comprises means for automatically controlling the display of said multiplicity of names and information, including automatically alphabetizing said names.

24. The display unit of claim 20 wherein:

the viewing window is at least one inch taller than the liquid-crystal display structure face, and is disposed so that a top edge of the viewing window is very roughly a half inch above the top edge of the liquid-crystal display structure face.

25. The display unit of claim 22, wherein:

the viewing window is at least one inch taller than the liquid-crystal display structure face, and is disposed so that a top edge of the viewing window is very roughly a half inch above the top edge of the liquid-crystal display structure face.

* * * * *